United States Patent
Nakayama et al.

(10) Patent No.: US 9,685,654 B2
(45) Date of Patent: Jun. 20, 2017

(54) METHOD FOR PRODUCING ELECTRODE

(71) Applicant: Ube Industries, Ltd., Yamaguchi (JP)

(72) Inventors: Takeshige Nakayama, Yamaguchi (JP); Tomonori Nakayama, Yamaguchi (JP); Naoki Kitayama, Yamaguchi (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 0 days.

(21) Appl. No.: 15/301,869

(22) PCT Filed: Apr. 17, 2015

(86) PCT No.: PCT/JP2015/061782
§ 371 (c)(1),
(2) Date: Oct. 4, 2016

(87) PCT Pub. No.: WO2015/159966
PCT Pub. Date: Oct. 22, 2015

(65) Prior Publication Data
US 2017/0025671 A1   Jan. 26, 2017

(30) Foreign Application Priority Data
Apr. 18, 2014 (JP) ................................ 2014-086562

(51) Int. Cl.
| | | |
|---|---|---|
| *H01M 4/04* | (2006.01) | |
| *H01M 4/13* | (2010.01) | |
| *H01M 4/1391* | (2010.01) | |
| *H01M 4/1393* | (2010.01) | |
| *H01M 4/1395* | (2010.01) | |
| *H01M 4/139* | (2010.01) | |
| *H01M 4/62* | (2006.01) | |
| *H01M 4/131* | (2010.01) | |
| *H01M 4/133* | (2010.01) | |
| *H01M 4/134* | (2010.01) | |
| *H01M 4/38* | (2006.01) | |
| *H01M 4/485* | (2010.01) | |
| *H01M 10/0525* | (2010.01) | |

(52) U.S. Cl.
CPC .......... *H01M 4/0404* (2013.01); *H01M 4/04* (2013.01); *H01M 4/0471* (2013.01); *H01M 4/13* (2013.01); *H01M 4/131* (2013.01); *H01M 4/133* (2013.01); *H01M 4/134* (2013.01); *H01M 4/139* (2013.01); *H01M 4/1391* (2013.01); *H01M 4/1393* (2013.01); *H01M 4/1395* (2013.01); *H01M 4/386* (2013.01); *H01M 4/387* (2013.01); *H01M 4/485* (2013.01); *H01M 4/622* (2013.01); *H01M 10/0525* (2013.01)

(58) Field of Classification Search
USPC ................................................ 427/58, 115
See application file for complete search history.

(56) References Cited

U.S. PATENT DOCUMENTS

| | | | |
|---|---|---|---|
| 5,468,571 A | 11/1995 | Fujimoto et al. | |
| 2009/0087748 A1 | 4/2009 | Choi et al. | |
| 2011/0311871 A1* | 12/2011 | Fukui | H01M 4/134 429/217 |
| 2012/0168688 A1 | 7/2012 | Nakayama et al. | |
| 2012/0171567 A1* | 7/2012 | Obika | H01M 2/08 429/210 |
| 2013/0171520 A1* | 7/2013 | Nakayama | C08G 73/1067 429/211 |
| 2013/0184385 A1* | 7/2013 | Ogihara | H01M 4/134 524/104 |
| 2013/0288120 A1* | 10/2013 | Iida | A61K 6/0017 429/211 |
| 2014/0011089 A1* | 1/2014 | Yamada | C08G 73/16 429/211 |
| 2014/0218875 A1* | 8/2014 | Nakayama | C08G 73/1021 361/751 |

FOREIGN PATENT DOCUMENTS

| | | |
|---|---|---|
| JP | 2000-103849 | 4/2000 |
| JP | 2007-217476 | 8/2007 |
| JP | 2011-137063 | 7/2011 |
| JP | 2012-003918 | 1/2012 |
| JP | 2013-020875 | 1/2013 |
| WO | WO 2011/040308 | 4/2011 |
| WO | WO 2012/132396 | 10/2012 |

OTHER PUBLICATIONS

International Search Report, PCT/JP2015/061782, Jun. 2, 2015.

\* cited by examiner

*Primary Examiner* — Brian K Talbot
(74) *Attorney, Agent, or Firm* — Young & Thompson

(57) ABSTRACT

An electrode is produced by forming an electrode layer on a surface of a current collector using an electrode composition containing a binder including a polyamide acid that is obtained from a specific aromatic tetracarboxylic acid compound and a diamine component containing a diamine having a carboxyl group, and subsequently performing heat treatment to remove a solvent and perform an imidization reaction of the polyamide acid. It is preferable that the electrode composition further contains a crosslinking agent having an epoxy group or an oxazoline group. It is also preferable that the electrode composition further contains a pyridine.

20 Claims, No Drawings

METHOD FOR PRODUCING ELECTRODE

TECHNICAL FIELD

The present invention relates to a method for producing an electrode of an electrochemical element such as a lithium ion secondary battery, and particularly relates to a method for producing an electrode using a binder including a polyamide acid.

BACKGROUND ART

Lithium ion secondary batteries have high energy density and high capacity, and thus are widely used as driving power sources for mobile data terminals and the like. In recent years, the use of lithium ion secondary batteries for industrial applications, for example, installation in electric and hybrid automobiles that require large capacity is also increasing, and studies for increasing the capacity and performance even more are conducted. One of such studies attempts to increase the charge and discharge capacity using silicon or tin, which can occlude a large amount of lithium per unit volume, or an alloy containing silicon or tin, as an active material for a negative electrode.

However, when an active material having a large charge and discharge capacity, such as silicon, tin, or an alloy containing silicon or tin, for example, is used, the active material significantly changes its volume in accordance with charging and discharging. For this reason, if polyvinylidene fluoride or a rubber resin, which are used for conventional electrodes, is used as a binding agent (binder), the problem arises in that due to breakage of an active material layer or the occurrence of detachment at an interface between a current collector and the active material layer, a current collecting structure of the electrode may be broken, and thus the cycle characteristics of the battery may easily deteriorate.

Thus, there is a demand for a binder for an electrode, the binder being unlikely to cause breakage or detachment of an electrode even when a significant change in volume occurs and having high toughness in a battery environment.

Patent Document 1 discloses that when a polyimide resin is used as a binding agent for a negative electrode of a lithium secondary battery, the battery capacity hardly decreases even after repeated charge-discharge cycles, and thus a long cycle life is achieved. According to this document, the electrode is produced by performing heat treatment at 350° C. for 2 hours (see Examples 1 and 2).

Patent Document 2 discloses a binder resin composition for an electrode, the binder resin composition including a specific polyamic acid and a solvent and exhibiting a low degree of swelling in an electrolyte solution and excellent toughness (high breaking elongation and breaking energy). Moreover, it is disclosed that during production of the electrode, heat treatment at a relatively high temperature is required so that an imidization reaction proceeds to a sufficient extent.

Patent Document 3 discloses a resin composition for an electrode of a lithium ion secondary battery, the resin composition containing a polyimide resin having a carboxyl group and an epoxy resin.

On the other hand, Non-Patent Document 1 states that a lower degree of swelling of a binder resin for an electrode in an electrolyte solution leads to a higher discharge capacity retention after charge-discharge cycles and is thus preferred.

CITATION LIST

Patent Documents

Patent Document 1: U.S. Pat. No. 5,468,571
Patent Document 2: US 2012/168688A1
Patent Document 3: JP 2013-20875A

Non-Patent Documents

Non-Patent Document 1: HITACHI CHEMICAL TECHNICAL REPORT Vol. 45 (July, 2005)

SUMMARY OF INVENTION

Technical Problem

To produce an electrode using polyimide as a binder, special equipment and environment are necessary because an extremely high heating temperature is required. For this reason, it is desirable that an electrode is produced by performing heat treatment at a relatively low temperature that is as low as the heating temperature used for an ordinary binder, such as polyvinylidene fluoride or a rubber resin, for a short period of time.

Moreover, with the recent trend toward extremely thinner current collectors (copper foil etc.) for batteries, current collectors having a thickness of 10 μm or less have come to be used. If such current collectors are exposed to a high temperature in electrode production processes, a considerable reduction in mechanical strength and other problems arise. Thus, it is desirable that heat treatment is performed at a relatively low temperature of 200° C. or less.

That is to say, an object of the present invention is to propose a method for producing an electrode with which a high-performance electrode for a lithium secondary battery, the electrode exhibiting a low degree of swelling and being capable of maintaining excellent adhesion and toughness even in a battery environment, can be easily obtained by performing heat treatment at a relatively low temperature of 200° C. or less for a relatively short period of time.

Solution to Problem

As a result of extensive studies, the inventors of the present application found that the use of an electrode composition containing a polyamide acid of a specific chemical structure makes it possible that a high-performance electrode for a lithium secondary battery, the electrode exhibiting a low degree of swelling and being capable of maintaining excellent adhesion and toughness even in a battery environment, can be easily obtained even when the electrode is produced by performing heat treatment at a relatively low temperature of 200° C. or less for a relatively short period of time, and thus accomplished the present invention.

The present invention relates to the following articles.

1. A method for producing an electrode, the method including forming an electrode layer on a surface of a current collector using an electrode composition containing at least an electrode active material and a binder including a polyamide acid having a repeating unit represented by a formula (1) below, and subsequently performing heat treatment to remove a solvent and perform an imidization reaction of the polyamide acid,

[Chem. 1]

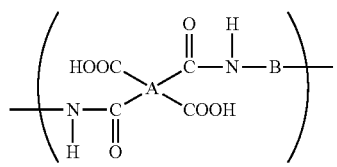

(1)

wherein in the formula (1), A includes at least one tetravalent group selected from the group consisting of tetravalent groups represented by formulae (2), (3), and (4) below, and B includes at least one divalent group selected from the group consisting of: divalent groups represented by formulae (5), (6), (7), and (8) below and divalent saturated hydrocarbon groups having 4 to 10 carbon atoms; and at least one divalent group selected from the group consisting of divalent groups represented by formulae (9) and (10) below,

[Chem. 2]

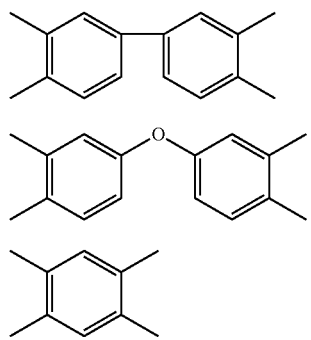

(2)

(3)

(4)

[Chem. 3]

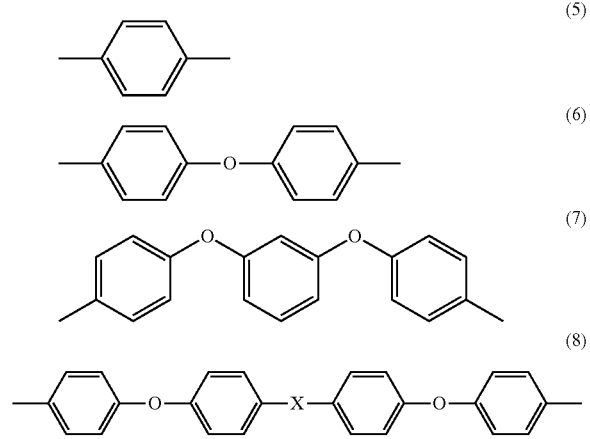

(5)

(6)

(7)

(8)

wherein in the formula (8), X is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group, and

[Chem. 4]

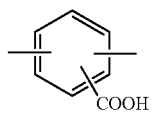

(9)

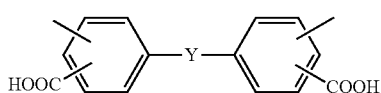

(10)

wherein in the formula (10), Y is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

2. The method for producing an electrode as set forth in clause 1, wherein the electrode composition further contains a crosslinking agent having an epoxy group or an oxazoline group.

3. The method for producing an electrode as set forth in clause 1 or 2, wherein the electrode composition further contains a pyridine compound.

4. The method for producing an electrode as set forth in any one of clauses 1 to 3, wherein the electrode active material is carbon powder, silicon powder, tin powder, or alloy powder containing silicon or tin.

5. The method for producing an electrode as set forth in any one of clauses 1 to 4, wherein the electrode active material is a lithium transition metal oxide.

6. The method for producing an electrode as set forth in any one of clauses 1 to 5, wherein an electrode for a lithium ion secondary battery is obtained.

Advantageous Effects of Invention

According to the present invention, it is possible to easily obtain a high-performance electrode for a lithium secondary battery, the electrode exhibiting a low degree of swelling and being capable of maintaining excellent adhesion and toughness even in a battery environment while using polyimide as a binder, by performing heat treatment at a relatively low temperature of 200° C. or less for a relatively short period of time.

DESCRIPTION OF EMBODIMENTS

With the method for producing an electrode according to the present invention, an electrode (negative electrode and positive electrode) especially for a lithium secondary battery can be advantageously produced. Hereinafter, the present invention will be described based on a method for producing an electrode especially for a lithium secondary battery. The present invention, however, is not limited to lithium secondary batteries.

In the present invention, it is preferable that a current collector is an electrically conductive metal foil that is usually used for a battery Preferred examples of the electrically conductive metal foil include foils of metals having electrical conductivity, such as copper, aluminum, nickel, stainless steel (iron), titanium, and cobalt, or of alloys including these metals. In particular, for lithium secondary batteries, a foil of copper or a copper alloy having a thickness of about 5 to 100 µm is preferable as a current collector of a negative electrode, and an aluminum foil having a thickness of about 5 to 100 µm is preferable as a current collector of a positive electrode, because of the ease of processing into thin foil films, inexpensiveness, the ease of enhancement of the performance of electrodes, and the like.

The surface roughness of the current collector may be adjusted as necessary. The current collector may also have a shape other than a foil shape, such as a flat plate shape, a mesh shape, a net shape, a lath shape, a perforated metal shape, and an embossed shape.

An electrode composition (electrode paste) used in the present invention contains at least an electrode active material, a binder including a polyamide acid having a specific repeating unit, and a solvent.

The electrode active material of the electrode composition used in the present invention is not limited as long as it is an electrode active material that is usually used for batteries. For a negative electrode, the electrode active material can be any material into and from which lithium can be electrochemically inserted and removed, and examples of such material include carbon powder, such as graphite, coke, carbon black, and pyrolytic carbon, silicon powder, tin powder, or alloy powder containing silicon or tin. The alloy powder is preferably an intermetallic compound including silicon or tin and a metallic element, and the metallic element is preferably a transition metal such as nickel, titanium, iron, cobalt, copper, zirconium, and manganese. For a positive electrode, the electrode active material can be any material which has lithium element and from and into which lithium can be electrochemically removed and inserted, and preferred examples of such material include lithium transition metal oxides such as $LiCoO_2$, $LiNiO_2$, $LiMnO_2$, $LiCo_{0.5}Mn_{0.5}O_2$, and $LiNi_{0.7}Co_{0.2}Mn_{0.1}O_2$.

The binder of the electrode composition used in the present invention includes a polyamide acid having a repeating unit of the above-described formula (1).

This polyamide acid can be easily prepared by reacting a tetracarboxylic acid component with a diamine component in a solvent, the reaction being performed at a low temperature in order to suppress an imidization reaction.

The tetracarboxylic acid component refers to tetracarboxylic acids, that is, a tetracarboxylic acid, a dianhydride thereof, an esterified compound thereof, and the like, and preferably is a dianhydride.

In the polyamide acid having the repeating unit represented by the formula (1), at least one tetravalent group selected from the group consisting of tetravalent groups represented by the above-described formulae (2), (3), and (4) is used as a tetravalent group represented by A. Such a tetravalent group is derived from a tetracarboxylic acid. In the following description, a tetracarboxylic acid from which such a tetravalent group is derived will be referred to as "tetracarboxylic acid component". The tetracarboxylic acid component constituting the polyamide acid of the present invention preferably is at least one tetracarboxylic acid selected from the group consisting of 4,4'-oxydiphthalic acids, 3,3',4,4'-biphenyltetracarboxylic acids, and pyromellitic acids, and preferably a 3,3',4,4'-biphenyltetracarboxylic acid or a mixture including a combination of a 4,4'-oxydiphthalic acid with a 3,3',4,4'-biphenyltetracarboxylic acid anchor a pyromellitic acid. Preferably, the mixture is a mixture including a combination of a 4,4'-oxydiphthalic acid in an amount of 10 to 90 mol % or more particularly 20 to 60 mol % with a 3,3',4,4'-biphenyltetracarboxylic acid and/or a pyromellitic acid in an amount of 90 to 10 mol % or more particularly 80 to 40 mol %.

In the polyamide acid having the repeating unit represented by the formula (1), at least one divalent group selected from the group consisting of divalent groups represented by the above-described formulae (5), (6), (7), and (8) and divalent saturated hydrocarbon groups having 4 to 10 carbon atoms is used as a divalent group represented by B. Such a divalent group is derived from a diamine. In the following description, a diamine from which such a divalent group is derived will be referred to as "diamine component". The diamine component constituting the polyamide acid of the present invention preferably includes at least one diamine selected from the group consisting of aromatic diamines having 1 to 4 aromatic rings and aliphatic diamines having 4 to 10 carbon atoms.

Preferred examples of the aromatic diamines having 1 to 4 aromatic rings include: aromatic diamines having a single aromatic ring, such as p-phenylenediamine, m-phenylenediamine, 2,4-diaminotoluene, 2,4-bis(β-amino-tert-butyl)toluene, bis-p-(1,1-dimethyl-5-amino-pentyl)benzene, 1-isopropyl-2,4-m-phenylenediamine, m-xylylenediamine, and p-xylylenediamine;

aromatic diamines having two aromatic rings, such as 4,4'-diaminodiphenyl ether, 4,4'-diaminodiphenyl methane, 3,3'-diaminodiphenyl methane, 3,3'-dichlorobenzidine, 4,4'-diaminodiphenyl sulfide, 3,3'-diaminodiphenyl sulfone, 1,5-diaminonaphthalene, 3,3'-dimethyl-4,4'-biphenyldiamine, benzidine, 3,3'-dimethylbenzidine, 3,3'-dimethoxybenzidine, 4,4'-diaminodiphenyl sulfone, 4,4'-diaminodiphenyl propane, bis(4-amino-3-carboxyphenyl)methane, and bis(p-β-amino-tert-butylphenyl)ether;

aromatic diamines having three aromatic rings, such as 1,3-bis(4-aminophenoxy)benzene, 1,4-bis(4-amino phenoxy)benzene, and bis(p-β-methyl-6-aminophenyl)benzene; and aromatic diamines having four aromatic rings, such as 2,2-bis[4-(4-aminophenoxy)phenyl]propane, bis[4-(4-aminophenoxy)phenyl]sulfone, and 4,4'-bis(4-aminophenoxy)biphenyl.

Moreover, as the aromatic diamines having four aromatic rings, aromatic diamines represented by a formula (8) below are preferable.

[Chem. 5]

(8)

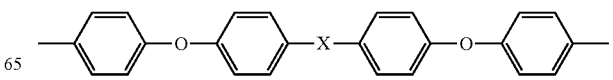

In the formula (8). X is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

Preferred examples of the aliphatic diamines having 4 to 10 carbon atoms include diamines such as 1,4-diaminobutane, 1,3-diaminopentane, 1,5-diaminopentane, 1,6-diaminohexane (hexamethylenediamine), 1,7-diaminoheptane, 1,8-diaminooctane, 1,9-diaminononane, and 1,10-diaminodecane.

The diamine component constituting the polyamide acid used in the present invention contains at least one diamine selected from the above-described aromatic diamines having 1 to 4 aromatic rings in an amount of 50 to 99 mol %, preferably 70 to 97 mol %, and more preferably 80 to 95 mol %.

In the present invention, as the divalent group represented by B of the polyamide acid having the repeating unit represented by the formula (1), in addition to at least one divalent group selected from the group consisting of divalent groups represented by the above-described formulae (5), (6), (7), and (8) as well as divalent saturated hydrocarbon groups having 4 to 10 carbon atoms, at least one divalent group derived from a diamine having a polar group is used. More specifically, the diamine component constituting the polyamide acid used in the present invention further contains a diamine having a polar group in an amount of 1 to 50 mol %, preferably 3 to 30 mol %, and more preferably 5 to 20 mol %. An aromatic diamine having a polar group such as a hydroxyl group or a carboxyl group, the polar group being reactive with an epoxy resin or the like, in the molecule is preferable as the diamine having a polar group.

Examples of the aromatic diamine having a polar group include diamine compounds having a hydroxyl group, such as diaminophenol compounds such as 2,4-diaminophenol; hydroxybiphenyl compounds such as 3,3'-diamino-4,4'-dihydroxybiphenyl, 4,4'-diamino-3,3'-dihydroxybiphenyl, 4,4'-diamino-2,2'-dihydroxybiphenyl, and 4,4'-diamino-2,2',5,5'-tetrahydroxybiphenyl; hydroxydiphenylalkane compounds such as 3,3'-diamino-4,4'-dihydroxydiphenylmethane, 4,4'-diamino-3,3'-dihydroxydiphenylmethane, 4,4'-diamino-2,2'-dihydroxydiphenylmethane, 2,2-bis[3-amino-4-hydroxyphenyl]propane, 2,2-bis[4-amino-3-hydroxyphenyl]propane, 2,2-bis[3-amino-4-hydroxyphenyl]hexafluoropropane, and 4,4'-diamino-2,2',5,5'-tetrahydroxydiphenylmethane; hydroxydiphenyl ether compounds such as 3,3'-diamino-4,4'-dihydroxydiphenyl ether, 4,4'-diamino-3,3'-dihydroxydiphenyl ether, 4,4'-diamino-2,2'-dihydroxydiphenyl ether, and 4,4'-diamino-2,2',5,5'-tetrahydroxydiphenyl ether; hydroxydiphenyl sulfone compounds such as 3,3'-diamino-4,4'-dihydroxydiphenyl sulfone, 4,4'-diamino-3,3'-dihydroxydiphenyl sulfone, 4,4'-diamino-2,2'-dihydroxydiphenyl sulfone, and 4,4'-diamino-2,2',5,5'-tetrahydroxydiphenyl sulfone; bis(hydroxyphenoxyphenyl)alkane compounds such as 2,2-bis[4-(4-amino-3-hydroxyphenoxy)phenyl]propane; bis(hydroxyphenoxy) biphenyl compounds such as 4,4'-bis(4-amino-3-hydroxyphenoxy)biphenyl; and bis(hydroxyphenoxyphenyl)sulfone compounds such as 2,2-bis[4-(4-amino-3-hydroxyphenoxy)phenyl]sulfone.

Examples of the aromatic diamine having a polar group further include diamine compounds having a carboxyl group, such as benzencarboxylic acids such as 3,5-diaminobenzoic acid and 2,4-diaminobenzoic acid; carboxybiphenyl compounds such as 3,3'-diamino-4,4'-dicarboxybiphenyl, 4,4'-diamino-3,3'-dicarboxybiphenyl, 4,4'-diamino-2,2'-dicarboxybiphenyl, and 4,4'-diamino-2,2',5,5'-tetracarboxybiphenyl; carboxydiphenylalkane compounds such as 3,3'-diamino-4,4'-dicarboxydiphenylmethane, 4,4'-diamino-3,3'-dicarboxydiphenylmethane, 4,4'-diamino-2,2'-dicarboxydiphenylmethane, 2,2-bis[3-amino-4-carboxyphenyl]propane, 2,2-bis[4-amino-3-carboxyphenyl]propane, 2,2-bis[3-amino-4-carboxyphenyl]hexafluoropropane, and 4,4'-diamino-2,2',5,5'-tetracarboxybiphenyl; carboxydiphenyl ether compounds such as 3,3'-diamino-4,4'-dicarboxydiphenyl ether, 4,4'-diamino-3,3'-dicarboxydiphenyl ether, 4,4'-diamino-2,2'-dicarboxydiphenyl ether, and 4,4'-diamino-2,2',5,5'-tetracarboxydiphenyl ether; carboxydiphenyl sulfone compounds such as 3,3'-diamino-4,4'-dicarboxydiphenyl sulfone, 4,4'-diamino-3,3'-dicarboxydiphenyl sulfone, and 4,4'-diamino-2,2',5,5'-tetracarboxydiphenyl sulfone; bis(carboxyphenoxyphenyl)alkane compounds such as 2,2-bis[4-(4-amino-3-carboxyphenoxy)phenyl]propane; bis(carboxyphenoxy)biphenyl compounds such as 4,4'-bis(4-amino-3-carboxyphenoxy)biphenyl; and bis(carboxyphenoxyphenyl)sulfone compounds such as 2,2-bis[4-(4-amino-3-carboxyphenoxy)phenyl]sulfone.

As the diamine compounds having a carboxyl group, aromatic diamines represented by formulae (9) and (10) below are preferable.

[Chem. 6]

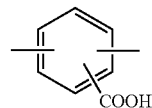

(9)

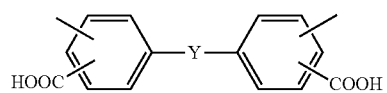

(10)

In the formula (10), Y is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

Preferably, the diamine component constituting the polyamide acid used in the present invention especially includes, among the above-described diamines at least one diamine selected from the group consisting of p-phenylenediamine, 4,4'-diaminodiphenyl ether, 1,3-bis(4-aminophenoxy)benzene, 2,2-bis[4-(4-aminophenoxy)phenyl]propane, bis[4-(4-aminophenoxy)phenyl]sulfone, 4,4'-bis(4-aminophenoxy)biphenyl, and hexamethylenediamine and at least one diamine selected from the group consisting of 4,4'-diamino-3,3'-dihydroxybiphenyl, 3,5-diaminobenzoic acid, and 4,4'-diamino-3,3'-dicarboxydiphenylmethane.

It is important that the molar ratio [tetracarboxylic acid component/diamine component] between the tetracarboxylic acid component and the diamine component that constitute the polyamide acid used in the present invention is set to a substantially equimolar ratio, specifically 0.95 to 1.05 and preferably 0.97 to 1.03. A molar ratio outside this molar ratio range results in a polyimide having a low molecular weight, and thus the toughness of the polyimide when used as a binder may be insufficient. Moreover, it is preferable that the polyamide acid used in the present invention has a high molecular weight with a logarithmic viscosity measured at a temperature of 30° C. and a concentration of 0.5 g/100 mL being 0.2 or more, preferably 0.4 or more, and more preferably 0.6 or more. If the logarithmic viscosity is lower than the above-described range, the polyamide acid has a low molecular weight, and thus it may be difficult to obtain a polyimide having characteristics suitable for a binder.

The polyamide acid can be easily prepared by reacting the diamine component with the tetracarboxylic acid component in the solvent in accordance with a known method. Usually, preparation of the polyamide acid can be advantageously performed by dissolving the diamine component in the solvent to obtain a solution, adding the tetracarboxylic acid component to this solution all at once or in multiple stages, and stirring the mixture. However, the present invention is not limited to this method. The reaction temperature is preferably 10° C. to 100° C., more preferably 15° C. to 80° C., and particularly preferably 15° C. to 50° C. A reaction temperature of lower than 10° C. reduces the rate of reaction and is not preferable, while a reaction temperature of higher than 100° C. may reduce the viscosity of the solution and is not preferable. The reaction time is preferably within a range from 0.5 hours to 72 hours, more preferably from 1 hour to 60 hours, and particularly preferably from 1.5 hours to 48 hours. A reaction time of shorter than 0.5 hours results in insufficient reaction, and in some cases the viscosity of the synthesized polyamic acid solution is unstable. On the other hand, spending a reaction time of 72 hours or longer is not preferable in terms of productivity.

In preparation of the polyamide acid, a known organic solvent in which the polyamide acid can be dissolved and which is used in preparation of an ordinary polyamide acid can be used. Examples of such an organic solvent include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl)ether, 1,2-bis(2-methoxyethoxy)ethane, tetrahydrofuran, bis[2-(2-methoxyethoxy)ethyl]ether, 1,4-dioxane, dimethyl sulfoxide, dimethyl sulfone, diphenyl ether, sulfolane, diphenyl sulfone, tetramethylurea, anisole, m-cresol, phenol, and γ-butyrolactone. These solvents can be used alone or in combination of two or more. Among these, in terms of the solubility of the polyamide acid and the safety, N,N-dimethylacetamide, N,N-diethylacetamide, N-methyl-2-pyrrolidone, N-ethyl-2-pyrrolidone, 1,3-dimethyl-2-imidazolidinone, and γ-butyrolactone are preferable, and N-methyl-2-pyrrolidone, N-ethyl-2-pyrrolidone, and γ-butyrolactone are particularly preferable.

In the prepared polyamide acid solution, the polyamide acid is uniformly dissolved in the solvent. This polyamide acid solution can be advantageously used as a solution in which the solid concentration attributable to the polyamide acid is from more than 5 mass % to 45 mass %, preferably from more than 10 mass % to 40 mass %, and more preferably from more than 15 mass % to 30 mass % with respect to the total amount of the solvent and the polyamide acid. If the solid concentration attributable to the polyamide acid is lower than 5 mass %, the viscosity of the solution is excessively low, and if the solid concentration is higher than 45 mass %, the solution may have no fluidity.

Moreover, with regard to the solution viscosity, the solution viscosity at 30° C. is preferably 1000 Pa·s or less, more preferably 0.5 to 500 Pa·s, even more preferably 1 to 300 Pa·s, and particularly preferably 3 to 200 Pa·s. If the solution viscosity exceeds 1000 Pa·s, mixing of the electrode active material powder and uniform application onto the current collector are difficult, and if the solution viscosity is lower than 0.5 Pa·s, dripping or the like occurs during mixing of the electrode active material powder and application onto the current collector, and there is a risk that the toughness of the polyimide resin after heat-drying and imidization may be low.

The polyamide acid may be isolated from the polyamide acid solution, which is obtained by reacting the diamine component with the tetracarboxylic acid component in the solvent, using a method in which, for example, the polyamide acid solution is put into a poor solvent to precipitate the polyamide acid, and the thus isolated polyamide acid be used (by dissolving it in a predetermined solvent again). Alternatively, the prepared polyamide acid solution may be used as is or after being simply diluted, for example, without isolating the polyamide acid from the obtained polyamide acid solution. In terms of the productivity and the cost, it is preferred to use the obtained polyamide acid solution as is without isolating the polyamide acid from the solution.

With regard to the solvent of the electrode composition (electrode paste) used in the present invention, a conventionally known organic solvent in which the polyamide acid can be dissolved can be advantageously used. An organic polar solvent having a boiling point of not more than 300° C. at normal pressures is preferable, and the above-described solvent that is used in preparation of the polyamide acid can be advantageously used.

Preferably, the electrode composition used in the present invention further contains a crosslinking agent having an epoxy group or an oxazoline group, because this makes it possible to suppress a reduction in the adhesive strength between an electrode layer and the current collector when the electrode composition comes into contact with an electrolyte solution. An example of the crosslinking agent having an epoxy group is an epoxy resin. Moreover, examples of the crosslinking agent having an oxazoline group include 1,3-phenylenebisoxazoline and resins containing an oxazoline group. The amount of the crosslinking agent to be added is preferably 0.05 to 5 mass % and more preferably 0.1 to 3 mass % with respect to the polyamide acid.

Preferably, the electrode composition used in the present invention further contains a pyridine compound, because this makes it possible to reduce the degree of swelling of the resultant polyimide binder in an electrolyte solution even more and increase the breaking elongation and the breaking energy even more and, furthermore, to reduce the heating time of the heat treatment for obtaining an electrode and reduce the heating temperature to an even lower temperature.

The pyridine compound refers to a compound having a pyridine skeleton in its chemical structure, and preferred examples thereof include pyridine, 3-pyridinol, quinoline, isoquinoline, quinoxaline, 6-tert-butylquinoline, acridine, 6-quinolinecarboxylic acid, 3,4-lutidine, and pyridazine. These pyridine compounds can be used alone or in combination of two or more.

The amount of the pyridine compound to be added is, but not limited to, preferably 0.05 to 2.0 molar equivalent and more preferably 0.1 to 1.0 molar equivalent with respect to the amide acid structure (per mol of the amide acid structure) of the polyamide acid. If the amount of the pyridine compound that is added is outside this range, it may be difficult to achieve the effects, which are provided by the addition of the pyridine compound, of reducing the degree of swelling of the resin in the electrolyte solution even more and increasing the breaking elongation and the breaking energy of the resulting polyimide binder even more, and furthermore suppressing the heating temperature of the heat treatment for obtaining an electrode to an even lower temperature.

The electrode composition used in the present invention can advantageously contain additives, such as a surfactant, a viscosity modifier (thickener), and a conductive aid (conductive agent), for example, that are contained in ordinary electrode compositions. Moreover, in the electrode composition used in the present invention, an additional binder component, other than the polyamide acid, including polyvinylidene fluoride or a rubber resin may also be mixed and used with the polyamide acid. It is preferable that the binder component other than the polyamide acid is contained in a proportion of less than 50 mass %, preferably less than 30 mass %, and more preferably less than 10 mass % in the total amount of binder component including the polyamide acid.

The electrode composition of the present invention is preferably obtained in slurry form by adding the electrode active material, and other components if necessary, to a binder resin composition for an electrode containing the polyamide acid, and sufficiently kneading the resultant mixture. The amount of the electrode active material in the electrode composition is not particularly limited, but is usually 0.1 to 1000 times by mass, preferably 1 to 1000 times by mass, more preferably 5 to 1000 times by mass, and even more preferably 10 to 1000 times by mass the solid mass attributable to the polyamic acid. If the amount of the electrode active material is excessively small, the electrode layer formed on the current collector has many inactive portions, and thus the function of the electrode may be insufficient. If the amount of the electrode active material is excessively large, the electrode active material does not sufficiently bind to the current collector and is likely to separate therefrom. It is preferable that the components of the electrode composition of the present invention are mixed so that the solid content attributable to the polyamide acid occupies 1 to 15 mass % of the total solid content. If this range is exceeded, the performance of the resultant electrode may be low.

In the method for producing an electrode of the present invention, the electrode composition containing at least the electrode active material, the binder including the polyamide acid, and the solvent is applied to and cast on a surface of the current collector, and thus a layered product in which an electrode layer is formed on the surface of the current collector is obtained. The electrode layer is adjusted so that a thickness of the electrode layer after drying is usually 10 to 300 µm. In this step, it is preferable that the electrode composition is continuously applied to or cast on the surface of the current collector while the current collector is continuously supplied. The electrode layer is formed on one side or both sides of the current collector.

Then, the layered product in which the electrode layer is formed on the surface of the current collector is heated to remove the solvent and convert the amide acid structure of the polyamide acid into an imide structure. Preferably, this heat treatment step is performed with a temperature range from 80° C. to 200° C., preferably from 90° C. to 180° C., and more preferably from 100° C. to 150° C.

At a heating temperature of less than 80° C., the progress of the imidization reaction may be insufficient, or the properties of a molded electrode product may deteriorate. On the other hand, at a heating temperature of more than 200° C., there is a risk that the current collector may deteriorate. The heat treatment may be performed using a method in which the temperature is increased gradually in multiple stages in order to prevent foaming and pulverization. The heating time is preferably within a range from 10 minutes to 48 hours. A heating time of not shorter than 48 hours is not preferable in terms of productivity, and a heating time of shorter than 10 minutes may result in insufficient imidization reaction and removal of the solvent.

During the heat treatment, most of the solvent is removed, and also the polyamide acid is substantially converted into polyimide by the imidization reaction. The heat treatment can be advantageously performed under a reduced pressure and under an inert gas flow in order to efficiently remove the solvent.

Here, "being substantially converted into polyimide" means that the amide acid structure may remain in polyimide, and it is sufficient if 70% or more, preferably 80% or more, and more preferably 90% or more of the amide acid structure is imidized. Completely imidizing the amide acid structure by heat treatment at a low temperature that is as low as the above-described temperature ranges is not always easy. However, the binder of the present invention, which includes a polyamide acid constituted by a repeating unit including a specific tetracarboxylic acid component and a diamine component, can develop the following excellent characteristics that are required of a binder for a high-performance battery, by heat treatment at a low temperature that is as low as the above-described temperature ranges. The excellent characteristics are the characteristics of exhibiting a low degree of swelling (the rate of increase in mass due to swelling when immersed in dimethylcarbonate at 25° C. for 24 hours is preferably not more than 2 mass % and more preferably not more than 1 mass %) and being capable of maintaining excellent adhesion (the 90° peel strength with respect to the current collector is not less than 0.5 N/mm and more preferably not less than 0.7 N/mm, the 90° peel strength retention after immersion in dimethylcarbonate at 25° C. for 24 hours is not less than 80%, more preferably not less than 85%, and even more preferably not less than 90%, and furthermore, in adhesion testing for determining adhesion to the current collector using a cross-cut method, detachment is less than 5%, and detachment after immersion in dimethylcarbonate at 25° C. for 24 hours is also less than 5%) and toughness even in a battery environment. Details of the 90° peel strength measurement and the adhesion testing using the cross-cut method will be described later.

With an electrode that is obtained using the method for producing an electrode of the present invention, it is possible to advantageously produce a battery in accordance with a known method. For example, in the case of a lithium secondary battery, the battery can be advantageously obtained in accordance with an ordinary method, in which a positive electrode and a negative electrode that are obtained are wound into, for example, a cylindrical shape while a separator such as a polyolefin porous body is sandwiched between the positive electrode and the negative electrode, the resultant cylindrical electrode body is kept in the cylindrical shape or flattened into a flat shape, and this electrode body and a non-aqueous electrolyte solution are inserted into an exterior body.

EXAMPLES

Hereinafter, the present invention will be more specifically described using examples. The examples below show that a binder (binder resin composition) including a polyamide acid having a repeating unit represented by the formula (1), which characterizes the present invention, sufficiently meets the characteristics that are required of a binder resin for an electrode, even when heat treatment of the binder is performed at a low temperature of 200° C. or less.

Methods for determining the characteristics used in the examples below are as follows:

Solid Concentration

Each sample solution (whose mass is denoted by $w_1$) was heated in a hot-air dryer at 120° C. for 10 minutes, at 250° C. for 10 more minutes, and then at 350° C. for 30 more minutes, and the mass (this mass is denoted by $w_2$) of the sample solution after the heat treatment was measured. The solid concentration [mass %] was calculated from an equation below.

$$\text{Solid concentration[mass \%]} = (w_2/w_1) \times 100$$

Logarithmic Viscosity

Each sample solution was diluted to a concentration of 0.5 g/dl (solvent: NMP) based on the solid concentration. With respect to this diluted solution, the flow time ($T_1$) was measured at 30° C. using a Cannon-Fenske viscometer No. 100. The logarithmic viscosity was calculated from an equation below using the flow time ($T_0$) with respect to blank NMP.

$$\text{Logarithmic viscosity} = \{\ln(T_1/T_0)\}/0.5$$

Solution Viscosity (Rotational Viscosity)

The sample solutions were subjected to measurement at 30° C. using an E-type viscometer manufactured by Tokimec Inc.

Solution Stability

The sample solutions were stored in an atmosphere in which the temperature was adjusted to 25° C., and a sample solution with respect to which the change in solution viscosity after one month was within ±10% was indicated by a circle mark, while a sample solution with respect to which the change in solution viscosity after one month exceeded ±10% was indicated by a cross mark. The change in solution viscosity is defined by {(solution viscosity after storage for one month−solution viscosity before storage)/solution viscosity before storage}×100.

Swelling Testing in DMC

A 5 cm square piece cut from an electrode constituted by a copper foil and an electrode layer was used as a sample. The mass of the electrode layer alone was obtained by subtracting the mass of the copper foil by calculation. The degree of swelling S of the electrode layer was measured by swelling testing in a dimethylcarbonate (DMC) solution described below. That is to say, the mass of the electrode layer after vacuum drying at 25° C. for 24 hours was regarded as dry mass ($W_d$), the mass of the electrode layer after immersion in the dimethylcarbonate solution at 25° C. for 24 hours was regarded as swollen mass ($W_w$), and the degree of swelling S was calculated from an equation below.

$$S[\text{mass \%}] = \{(W_w - W_d)/W_w\} \times 100$$

Adhesion Testing (Cross-Cut Method)

Adhesion testing was performed in conformity with JIS K 5600-5-6. The evaluations were made visually on a scale from Class 0 to Class 5 (the smaller the number, the stronger the adhesion) in accordance with the evaluation criteria (3).

Note that the adhesion testing was performed on each sample both before and after the swelling testing in the dimethylcarbonate solution.

Measurement of 90° Peel Strength

In 90° peel strength testing, measurement was performed in conformity with IPC-TM650 using a universal testing machine (RTC-1225A manufactured by Orientec Corporation).

90° Peel Strength Retention

With respect to each sample before and after the swelling testing in the dimethylcarbonate solution, the 90° peel strength was measured and the 90° peel strength retention was calculated from an equation below.

$$90° \text{ peel strength retention [\%]} = (90° \text{ peel strength after immersion}/90° \text{ peel strength before immersion}) \times 100$$

Compounds used in the examples below are abbreviated as follows:
ODPA: 4,4'-oxydiphthalic dianhydride
s-BPDA: 3,3',4,4'-biphenyltetracarboxylic dianhydride
PPD: p-phenylenediamine
ODA: 4,4'-diaminodiphenyl ether
HMD: hexamethylenediamine
3,5-DABA: 3,5-diaminobenzoic acid
MBAA: 4,4'-diamino-3,3'-dicarboxydiphenylmethane
1,3-PBO: 1,3-phenylenebisoxazoline Example 1

First, 400 g of NMP serving as a solvent was added into a glass reaction vessel having an internal volume of 500 mL and equipped with a stirrer and a nitrogen gas inlet and outlet tube. Then, 36.81 g (0.184 mol) of ODA and 3.11 g (0.020 mop of 3,5-DABA as well as 60.09 g of (0.204 mol) s-BPDA were added to the solvent, followed by stirring at 50° C. for 10 hours to obtain a polyamide acid solution having a solid concentration of 18.2 mass %, a solution viscosity of 5.3 Pa·s, and a logarithmic viscosity of 0.62.

An epoxy resin was added to the obtained polyamide acid solution to a concentration of 1 mass % to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 4.4 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 2

The various kinds of testing were performed in the same manner as in Example 1 except that instead of the epoxy resin, 1,3-PBO was added to the binder resin composition for an electrode to a concentration of 1 mass %.

Table 1 shows the results.

Example 3

Testing was performed in the same manner as in Example 1 except that nothing was added to the binder resin composition for an electrode of Example 1.

Table 1 shows the results.

Example 4

First, 400 g of NMP serving as a solvent was added into a glass reaction vessel having an internal volume of 500 mL and equipped with a stirrer and a nitrogen gas inlet and outlet tube. Then, 35.83 g (0.179 mol) of ODA and 5.69 g (0.020 mol) of MBAA as well as 58.48 g (0.199 mol) of s-BPDA were added to the solvent, followed by stirring at 50° C. for 10 hours to obtain a polyamide acid solution having a solid concentration of 18.1 mass %, a solution viscosity of 5.1 Pa·s, and a logarithmic viscosity of 0.65.

An epoxy resin was added to the obtained polyamide acid solution to a concentration of 1 mass % to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 1 shows the results.

Then, 4.4 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 1 shows the results.

Example 5

The various kinds of testing were performed in the same manner as in Example 4 except that instead of the epoxy resin, 1,3-PBO was added to the binder resin composition for an electrode to a concentration of 1 mass %.

Table 1 shows the results.

Example 6

Testing was performed in the same manner as in Example 4 except that nothing was added to the binder resin composition for an electrode of Example 4.

Table 1 shows the results.

TABLE 1

|  |  | Ex. 1 | Ex. 2 | Ex. 3 | Ex. 4 | Ex. 5 | Ex. 6 |
|---|---|---|---|---|---|---|---|
| Binder resin composition for electrode | | | | | | | |
| Acid component | s-BPDA (mol %) | 100 | 100 | 100 | 100 | 100 | 100 |
|  | ODPA (mol %) | | | | | | |
| Diamine component | PPD (mol %) | | | | | | |
|  | ODA (mol %) | 90 | 90 | 90 | 90 | 90 | 90 |
|  | HMD (mol %) | | | | | | |
|  | 3,5-DABA (mol %) | 10 | 10 | 10 | | | |
|  | MBAA (mol %) | | | | 10 | 10 | 10 |
| Additive | Epoxy resin (mass %) | 1 | | | 1 | | |
|  | 1,3-PBO (mass %) | | 1 | | | 1 | |
| Solvent | | NMP | NMP | NMP | NMP | NMP | NMP |
| Polyamide acid solution | | | | | | | |
|  | Logarithmic viscosity | 0.62 | Same as the left | Same as the left | 0.65 | Same as the left | Same as the left |
|  | Solid concentration (mass %) | 18.2 | | | 18.1 | | |
|  | Solution viscosity (Pa · s) | 5.3 | | | 5.1 | | |
|  | Solution stability | ○ | | | ○ | | |

TABLE 1-continued

|  | Ex. 1 | Ex. 2 | Ex. 3 | Ex. 4 | Ex. 5 | Ex. 6 |
|---|---|---|---|---|---|---|
| Characteristics of binder resin film | | | | | | |
| Heat treatment conditions | 120° C. × 1 Hr | 120° C. × 1 Hr | 120° C. × 1 Hr | 120° C. × 1 Hr | 120° C. × 1 Hr | 120° C. × 1 Hr |
| Degree of swelling in DMC (mass %) | 0.2 | 0.1 | 0.3 | 0.3 | 0.1 | 0.2 |
| Before swelling testing  90° peel strength (N/mm) | 0.94 | 0.97 | 0.82 | 1.05 | 1.08 | 0.87 |
| Before swelling testing  Class determined by adhesion testing | Class 0 | Class 0 | Class 1 | Class 0 | Class 0 | Class 3 |
| After swelling testing in DMC  90° peel strength (N/mm) | 0.90 | 0.94 | 0.68 | 1.00 | 1.02 | 0.75 |
| After swelling testing in DMC  Class determined by adhesion testing | Class 0 | Class 0 | Class 3 | Class 0 | Class 0 | Class 5 |
| 90° peel strength retention (%) | 96 | 97 | 83 | 95 | 94 | 86 |
| Characteristics of electrode | | | | | | |
| Degree of swelling in DMC (mass %) | 0.1 | 0.1 | 0.2 | 0.1 | 0.0 | 0.0 |
| Before swelling testing  Class determined by adhesion testing | Class 0 | Class 0 | Class 1 | Class 0 | Class 0 | Class 1 |
| After swelling testing in DMC  Class determined by adhesion testing | Class 0 | Class 0 | Class 2 | Class 0 | Class 0 | Class 2 |

Notes:
Brief description of classification of adhesion testing
Class 0: None of the squares of the lattice is detached.
Class 1: 5% or less is affected.
Class 2: The affected area is more than 5% and 15% or less of the lattice.
Class 3: The affected area is more than 15% and 35% or less of the lattice.
Class 4: The affected area is more than 35% and 65% or less of the lattice.
Class 5: The extent of detachment is worse than Class 4.

Example 7

First, 400 g of NMP serving as a solvent was added into a glass reaction vessel having an internal volume of 500 mL and equipped with a stirrer and a nitrogen gas inlet and outlet tube. Then, 13.20 g (0.066 mol) of ODA, 3.34 g (0.022 mol) of 3,5-DABA and 15.32 g (0.132 mol) of HMD, as well as 68.14 g (0.220 mol) of ODPA were added to the solvent, followed by stirring at 50° C. for 10 hours to obtain a polyamide acid solution having a solid concentration of 17.9 mass %, a solution viscosity of 5.0 Pa·s, and a logarithmic viscosity of 0.71.

An epoxy resin was added to the obtained polyamide acid solution to a concentration of 1 mass % to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 2 shows the results.

Then, 4.5 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 2 shows the results.

Example 8

The various kinds of testing were performed in the same manner as in Example 7 except that instead of the epoxy resin, 1,3-PBO was added to the binder resin composition for an electrode to a concentration of 1 mass %.

Table 2 shows the results.

Example 9

Testing was performed in the same manner as in Example 7 except that nothing was added to the binder resin composition for an electrode of Example 7.

Table 2 shows the results.

Example 10

First, 400 g of NMP serving as a solvent was added into a glass reaction vessel having an internal volume of 500 mL and equipped with a stirrer and a nitrogen gas inlet and outlet tube. Then, 12.82 g (0.064 mol) of ODA, 6.11 g (0.021 mol) of MBAA and 14.88 g (0.128 mol) of HMD, as well as 66.19 g (0.213 mol) of ODPA were added to the solvent, followed by stirring at 50° C. for 10 hours to obtain a polyamide acid solution having a solid concentration of 18.0 mass %, a solution viscosity of 4.9 Pa·s, and a logarithmic viscosity of 0.73.

An epoxy resin was added to the obtained polyamide acid solution to a concentration of 1 mass % to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 2 shows the results.

Then, 4.5 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 2 shows the results.

Example 11

The various kinds of testing were performed in the same manner as in Example 10 except that instead of the epoxy resin, 1,3-PBO was added to the binder resin composition for an electrode to a concentration of 1 mass %.

Table 2 shows the results.

Example 12

Testing was performed in the same manner as in Example 10 except that nothing was added to the binder resin composition for an electrode of Example 10.

Table 2 shows the results.

TABLE 2

|  |  | Ex. 7 | Ex. 8 | Ex. 9 | Ex. 10 | Ex. 11 | Ex. 12 |
|---|---|---|---|---|---|---|---|
| Binder resin composition for electrode | | | | | | | |
| Acid component | s-BPDA (mol %) | | | | | | |
| | ODPA (mol %) | 100 | 100 | 100 | 100 | 100 | 100 |
| Diamine component | PPD (mol %) | | | | | | |
| | ODA (mol %) | 30 | 30 | 30 | 30 | 30 | 30 |
| | HMD (mol %) | 60 | 60 | 60 | 60 | 60 | 60 |
| | 3,5-DABA (mol %) | 10 | 10 | 10 | | | |
| | MBAA (mol %) | | | | 10 | 10 | 10 |
| Additive | Epoxy resin (mass %) | 1 | | | 1 | | |
| | 1,3-PBO (mass %) | | 1 | | | 1 | |
| Solvent | | NMP | NMP | NMP | NMP | NMP | NMP |
| Polyamide acid solution | | | | | | | |
| | Logarithmic viscosity | 0.71 | Same as the left | Same as the left | 0.73 | Same as the left | Same as the left |
| | Solid concentration (mass %) | 17.9 | | | 18.0 | | |
| | Solution viscosity (Pa·s) | 5.0 | | | 4.9 | | |
| | Solution stability | ○ | | | ○ | | |
| Characteristics of binder resin film | | | | | | | |
| | Heat treatment conditions | 120° C. × 1 Hr | 120° C. × 1 Hr | 120° C. × 1 Hr | 120° C. × 1 Hr | 120° C. × 1 Hr | 120° C. × 1 Hr |
| | Degree of swelling in DMC (mass %) | 0.4 | 0.4 | 0.5 | 0.6 | 0.5 | 0.6 |
| Before swelling testing | 90° peel strength (N/mm) | 1.08 | 1.14 | 0.98 | 1.12 | 1.15 | 1.03 |
| | Class determined by adhesion testing | Class 0 | Class 0 | Class 3 | Class 0 | Class 0 | Class 4 |
| After swelling testing in DMC | 90° peel strength (N/mm) | 1.03 | 1.10 | 0.80 | 1.08 | 1.12 | 0.84 |
| | Class determined by adhesion testing | Class 0 | Class 0 | Class 5 | Class 0 | Class 0 | Class 5 |
| | 90° peel strength retention (%) | 95 | 96 | 82 | 96 | 97 | 82 |
| Characteristics of electrode | | | | | | | |
| | Degree of swelling in DMC (mass %) | 0.2 | 0.2 | 0.3 | 0.3 | 0.2 | 0.3 |
| Before swelling testing | Class determined by adhesion testing | Class 0 | Class 0 | Class 2 | Class 0 | Class 0 | Class 2 |
| After swelling testing in DMC | Class determined by adhesion testing | Class 0 | Class 0 | Class 2 | Class 0 | Class 0 | Class 3 |

Notes:
Brief description of classification of adhesion testing
Class 0: None of the squares of the lattice is detached.
Class 1: 5% or less is affected.
Class 2: The affected area is more than 5% and 15% or less of the lattice.
Class 3: The affected area is more than 15% and 35% or less of the lattice.
Class 4: The affected area is more than 35% and 65% or less of the lattice.
Class 5: The extent of detachment is worse than Class 4.

Example 13

First, 400 g of NMP serving as a solvent was added into a glass reaction vessel having an internal volume of 500 mL and equipped with a stirrer and a nitrogen gas inlet and outlet tube. Then, 4.51 g (0.042 mol) of PPD, 29.25 g (0.146 mol) of ODA and 3.18 g (0.021 mol) of 3,5-DABA, as well as 30.70 g (0.104 mol) of s-BPDA and 32.37 g (0.104 mol) of ODPA were added to the solvent, followed by stirring at 50° C. for 10 hours to obtain a polyamide acid solution having a solid concentration of 18.2 mass %, a solution viscosity of 5.3 Pa·s, and a logarithmic viscosity of 0.68.

An epoxy resin was added to the obtained polyamide acid solution to a concentration of 1 mass % to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 3 shows the results.

Then, 4.5 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 3 shows the results.

Example 14

The various kinds of testing were performed in the same manner as in Example 13 except that instead of the epoxy resin, 1,3-PBO was added to the binder resin composition for an electrode to a concentration of 1 mass %.

Table 3 shows the results.

Example 15

Testing was performed in the same manner as in Example 13 except that nothing was added to the binder resin composition for an electrode of Example 13.

Table 3 shows the results.

Example 16

First, 400 g of NMP serving as a solvent was added into a glass reaction vessel having an internal volume of 500 mL and equipped with a stirrer and a nitrogen gas inlet and outlet tube. Then, 4.51 g (0.042 mol) of PPD, 29.25 g (0.146 mol) of ODA and 3.18 g (0.021 mol) of 3,5-DABA, as well as 30.70 g (0.104 mol) of s-BPDA and 32.37 g (0.104 mol) of ODPA were added to the solvent, followed by stirring at 50° C. for 10 hours to obtain a polyamide acid solution having a solid concentration of 18.1 mass %, a solution viscosity of 5.1 Pa·s, and a logarithmic viscosity of 0.67.

An epoxy resin was added to the obtained polyamide acid solution to a concentration of 1 mass % to obtain a binder resin composition for an electrode.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 3 shows the results.

Then, 4.5 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 3 shows the results.

Example 17

The various kinds of testing were performed in the same manner as in Example 16 except that instead of the epoxy resin, 1,3-PBO was added to the binder resin composition for an electrode to a concentration of 1 mass %.

Table 3 shows the results.

Example 18

Testing was performed in the same manner as in Example 16 except that nothing was added to the binder resin composition for an electrode of Example 16.

Table 3 shows the results.

TABLE 3

| | | Ex. 13 | Ex. 14 | Ex. 15 | Ex. 16 | Ex. 17 | Ex. 18 |
|---|---|---|---|---|---|---|---|
| Binder resin composition for electrode | | | | | | | |
| Acid component | s-BPDA (mol %) | 50 | 50 | 50 | 50 | 50 | 50 |
| | ODPA (mol %) | 50 | 50 | 50 | 50 | 50 | 50 |
| Diamine component | PPD (mol %) | 20 | 20 | 20 | 20 | 20 | 20 |
| | ODA (mol %) | 70 | 70 | 70 | 70 | 70 | 70 |
| | HMD (mol %) | | | | | | |
| | 3,5-DABA (mol %) | 10 | 10 | 10 | | | |
| | MBAA (mol %) | | | | 10 | 10 | 10 |
| Additive | Epoxy resin (mass %) | 1 | | | 1 | | |
| | 1,3-PBO (mass %) | | 1 | | | 1 | |
| Solvent | | NMP | NMP | NMP | NMP | NMP | NMP |
| Polyamide acid solution | | | | | | | |
| | Logarithmic viscosity | 0.68 | Same as the left | Same as the left | 0.67 | Same as the left | Same as the left |
| | Solid concentration (mass %) | 18.2 | | | 18.1 | | |
| | Solution viscosity (Pa · s) | 5.3 | | | 5.1 | | |
| | Solution stability | ○ | | | ○ | | |
| Characteristics of binder resin film | | | | | | | |
| | Heat treatment conditions | 120° C. × 1 Hr | 120° C. × 1 Hr | 120° C. × 1 Hr | 120° C. × 1 Hr | 120° C. × 1 Hr | 120° C. × 1 Hr |
| | Degree of swelling in DMC (mass %) | 0.0 | 0.0 | 0.1 | 0.1 | 0.0 | 0.2 |
| Before swelling testing | 90° peel strength (N/mm) | 0.96 | 0.99 | 0.88 | 1.02 | 1.05 | 0.95 |
| | Class determined by adhesion testing | Class 0 | Class 0 | Class 1 | Class 0 | Class 0 | Class 0 |
| After swelling testing in DMC | 90° peel strength (N/mm) | 0.90 | 0.95 | 0.75 | 0.96 | 1.00 | 0.77 |
| | Class determined by adhesion testing | Class 0 | Class 0 | Class 4 | Class 0 | Class 0 | Class 3 |
| | 90° peel strength retention (%) | 94 | 96 | 85 | 94 | 95 | 81 |
| Characteristics of electrode | | | | | | | |
| | Degree of swelling in DMC (mass %) | 0.0 | 0.0 | 0.0 | 0.0 | 0.0 | 0.1 |
| Before swelling testing | Class determined by adhesion testing | Class 0 | Class 0 | Class 0 | Class 0 | Class 0 | Class 0 |
| After swelling testing in DMC | Class determined by adhesion testing | Class 0 | Class 0 | Class 1 | Class 0 | Class 0 | Class 1 |

Notes:
Brief description of classification of adhesion testing
Class 0: None of the squares of the lattice is detached.
Class 1: 5% or less is affected.
Class 2: The affected area is more than 5% and 15% or less of the lattice.
Class 3: The affected area is more than 15% and 35% or less of the lattice.
Class 4: The affected area is more than 35% and 65% or less of the lattice.
Class 5: The extent of detachment is worse than Class 4.

Comparative Example 1

First, 400 g of NMP serving as a solvent was added into a glass reaction vessel having an internal volume of 500 mL and equipped with a stirrer and a nitrogen gas inlet and outlet tube. Then, 40.50 g (0.202 mol) of ODA and 59.50 g (0.202 mol) of s-BPDA were added to the solvent, followed by stirring at 50° C. for 10 hours to obtain a polyamide acid solution having a solid concentration of 18.4 mass %, a solution viscosity of 5.1 Pa·s, and a logarithmic viscosity of 0.64. The obtained polyamide acid solution was used as a binder resin composition for an electrode on an "as is" basis.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 4 shows the results.

Then, 4.4 g of the binder resin composition for an electrode (solid mass after imidization: 0.8 g) and 9.2 g of mesh silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 4 shows the results.

Comparative Example 2

First, 400 g of NMP serving as a solvent was added into a glass reaction vessel having an internal volume of 500 mL and equipped with a stirrer and a nitrogen gas inlet and outlet tube. Then, 29.52 g (0.147 mol) of ODA and 6.83 g (0.063 mol) of PPD, as well as 30.98 g (0.105 mol) of s-BPDA and 32.67 g (0.105 mol) of ODPA were added to the solvent, followed by stirring at 50° C. for 10 hours to obtain a polyamide acid solution having a solid concentration of 18.3 mass %, a solution viscosity of 4.8 Pa·s, and a logarithmic viscosity of 0.69. The obtained polyamide acid solution was used as a binder resin composition for an electrode on an "as is" basis.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 4 shows the results.

Then, 4.4 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 4 shows the results.

Comparative Example 3

First, 400 g of NMP serving as a solvent was added into a glass reaction vessel having an internal volume of 500 mL and equipped with a stirrer and a nitrogen gas inlet and outlet tube. Then, 17.41 g (0.087 mol) of ODA and 15.16 g (0.130 mol) of HMD as well as 67.43 g (0.217 mol) of ODPA were added to the solvent, followed by stirring at 50° C. for 10 hours to obtain a polyamide acid solution having a solid concentration of 18.5 mass %, a solution viscosity of 4.5 Pa·s, and a logarithmic viscosity of 0.70. The obtained polyamide acid solution was used as a binder resin composition for an electrode on an "as is" basis.

A copper foil to which the binder resin composition for an electrode was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, a binder resin film having a thickness of 25 μm was formed.

Swelling testing in DMC was performed using the binder resin film formed on the copper foil as a sample. Moreover, adhesion testing and measurement of the 90° peel strength were performed on the sample before and after the swelling testing in the dimethylcarbonate solution.

Table 4 shows the results.

Then, 4.4 g of the binder resin composition for an electrode (solid mass after imidization: 0.8 g) and 9.2 g of silicon powder capable passing 325 mesh were kneaded together in a mortar in such a manner as to be mashed to prepare an electrode composition (electrode paste). The obtained paste was able to be thinly spread on a copper foil with a glass rod.

The copper foil to which the paste was applied was fixed on a substrate, and defoamed and preliminarily dried at 25° C. under a reduced pressure for 30 minutes. After that, the substrate was placed in a hot-air dryer in a nitrogen gas atmosphere under normal pressures and heated at 120° C. for 1 hour. Thus, an electrode with an electrode layer having a thickness of 100 μm was produced.

Swelling testing in DMC was performed using the obtained electrode as a sample. Moreover, adhesion testing was performed on the sample before and after the swelling testing in the dimethylcarbonate solution.

Table 4 shows the results.

TABLE 4

| | | | Com. Ex. 1 | Com. Ex. 2 | Com. Ex. 3 |
|---|---|---|---|---|---|
| | Binder resin composition for electrode | | | | |
| Acid component | s-BPDA (mol %) | | 100 | 50 | |
| | ODPA (mol %) | | | 50 | 100 |
| Diamine component | PPD (mol %) | | | 30 | |
| | ODA (mol %) | | 100 | 70 | 40 |
| | HMD (mol %) | | | | 60 |
| | 3,5-DABA (mol %) | | | | |
| | MBAA (mol %) | | | | |
| Additive | Epoxy resin (mass %) | | | | |
| | 1,3-PBO (mass %) | | | | |
| Solvent | | | NMP | NMP | NMP |
| Polyamide acid solution | Logarithmic viscosity | | 0.64 | 0.69 | 0.70 |
| | Solid concentration (mass %) | | 18.4 | 18.3 | 18.5 |
| | Solution viscosity (Pa · s) | | 5.1 | 4.8 | 4.5 |
| | Solution stability | | ○ | ○ | ○ |
| Characteristics of binder resin film | Heat treatment conditions | | 120° C. × 1 Hr | 120° C. × 1 Hr | 120° C. × 1 Hr |
| | Degree of swelling in DMC (mass %) | | 0.2 | 0.4 | 0.7 |
| | Before swelling testing | 90° peel strength (N/mm) | 0.70 | 0.84 | 0.89 |
| | | Class determined by adhesion testing | Class 1 | Class 1 | Class 0 |
| | After swelling testing in DMC | 90° peel strength (N/mm) | 0.50 | 0.57 | 0.61 |
| | | Class determined by adhesion testing | Class 4 | Class 2 | Class 2 |
| | | 90° peel strength retention (%) | 71 | 68 | 69 |

TABLE 4-continued

|  |  | Com. Ex. 1 | Com. Ex. 2 | Com. Ex. 3 |
|---|---|---|---|---|
| Characteristics of electrode | Degree of swelling in DMC (mass %) | 0.3 | 0.3 | 0.4 |
|  | Before swelling Class determined by adhesion testing testing | Class 2 | Class 0 | Class 1 |
|  | After swelling Class determined by adhesion testing testing in DMC | Class 4 | Class 2 | Class 3 |

Notes:
Brief description of classification of adhesion testing
Class 0: None of the squares of the lattice is detached.
Class 1: 5% or less is affected.
Class 2: The affected area is more than 5% and 15% or less of the lattice.
Class 3: The affected area is more than 15% and 35% or less of the lattice.
Class 4: The affected area is more than 35% and 65% or less of the lattice.
Class 5: The extent of detachment is worse than Class 4.

The invention claimed is:

1. A method for producing an electrode, the method comprising forming an electrode layer on a surface of a current collector using an electrode composition containing at least an electrode active material and a binder comprising a polyamide acid having a repeating unit represented by a formula (1) below, and subsequently performing heat treatment to remove a solvent and perform an imidization reaction of the polyamide acid,

[Chem. 1]

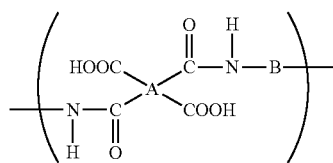
(1)

wherein in the formula (1), A comprises at least one tetravalent group selected from the group consisting of tetravalent groups represented by formulae (2), (3), and (4) below, and B comprises at least one divalent group selected from the group consisting of: divalent groups represented by formulae (5), (6), (7), and (8) below and divalent saturated hydrocarbon groups having 4 to 10 carbon atoms; and at least one divalent group selected from the group consisting of divalent groups represented by formulae (9) and (10) below,

[Chem. 2]

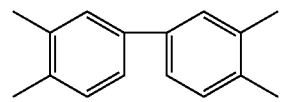
(2)

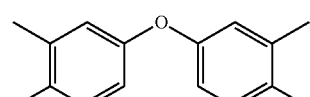
(3)

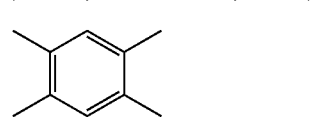
(4)

-continued

[Chem. 3]

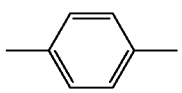
(5)

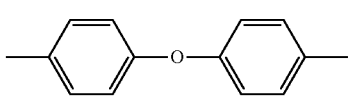
(6)

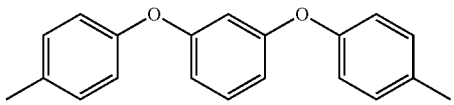
(7)

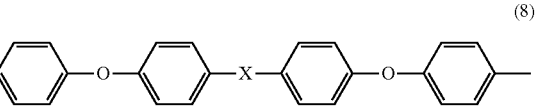
(8)

wherein in the formula (8), X is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group, and

[Chem. 4]

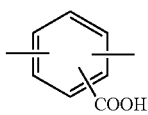
(9)

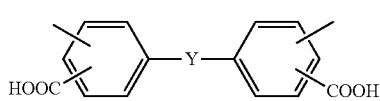

wherein in the formula (10), Y is any of a direct bond, an oxygen atom, a sulfur atom, a methylene group, a carbonyl group, a sulfoxyl group, a sulfone group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, and a sulfonediphenoxy group.

2. The method for producing an electrode according to claim 1, wherein the electrode composition further contains a crosslinking agent having an epoxy group or an oxazoline group.

3. The method for producing an electrode according to claim 1, wherein the electrode composition further contains a pyridine compound.

4. The method for producing an electrode according to claim 1, wherein the electrode active material is carbon powder, silicon powder, tin powder, or alloy powder containing silicon or tin.

5. The method for producing an electrode according to claim 1, wherein the electrode active material is a lithium transition metal oxide.

6. The method for producing an electrode according to claim 1, wherein an electrode for a lithium ion secondary battery is obtained.

7. The method for producing an electrode according to claim 2, wherein the electrode composition further contains a pyridine compound.

8. The method for producing an electrode according to claim 2, wherein the electrode active material is carbon powder, silicon powder, tin powder, or alloy powder containing silicon or tin.

9. The method for producing an electrode according to claim 3, wherein the electrode active material is carbon powder, silicon powder, tin powder, or alloy powder containing silicon or tin.

10. The method for producing an electrode according to claim 2, wherein the electrode active material is a lithium transition metal oxide.

11. The method for producing an electrode according to claim 3, wherein the electrode active material is a lithium transition metal oxide.

12. The method for producing an electrode according to claim 4, wherein the electrode active material is a lithium transition metal oxide.

13. The method for producing an electrode according to claim 2, wherein an electrode for a lithium ion secondary battery is obtained.

14. The method for producing an electrode according to claim 3, wherein an electrode for a lithium ion secondary battery is obtained.

15. The method for producing an electrode according to claim 4, wherein an electrode for a lithium ion secondary battery is obtained.

16. The method for producing an electrode according to claim 5, wherein an electrode for a lithium ion secondary battery is obtained.

17. The method for producing an electrode according to claim 7, wherein the electrode active material is carbon powder, silicon powder, tin powder, or alloy powder containing silicon or tin.

18. The method for producing an electrode according to claim 7, wherein the electrode active material is a lithium transition metal oxide.

19. The method for producing an electrode according to claim 8, wherein the electrode active material is a lithium transition metal oxide.

20. The method for producing an electrode according to claim 9, wherein the electrode active material is a lithium transition metal oxide.

* * * * *